United States Patent Office 3,679,617
Patented July 25, 1972

3,679,617
FLEXIBILIZED PHENOL-FORMALDEHYDE RESINS
Jack B. Boylan and Robert J. Sturwold, Cincinnati, Ohio, assignors to Emery Industries, Inc., Cincinnati, Ohio
No Drawing. Filed Sept. 22, 1969, Ser. No. 860,079
Int. Cl. C08g 5/20
U.S. Cl. 260—19 R                              8 Claims

ABSTRACT OF THE DISCLOSURE

Internally flexibilized phenol-formaldehyde resins are prepared from formaldehyde, phenol and a phenolated oil obtained by reacting an excess of a phenolic compound with a non-conjugated, unsaturated oil in the presence of an active clay catalyst, the catalyst optionally containing a minor amount of a mineral acid.

BACKGROUND OF INVENTION

(1) Field of invention

This invention relates to the field of phenolic resins, and more particularly, to internally flexibilized phenol-formaldehyde resins.

(2) Prior art

Phenol-formaldehyde resins are used extensively in varnishes and laminates. However, because of the extreme brittleness exhibited by these resins for certain applications, they must be modified by internal or external plasticizers to improve their flexibility. In many of these applications, internal plasticization, which involves a chemical reaction between the plasticizer and the phenol-formaldehyde resin, is preferred.

In general, internal plasticizers have been found to flexibilize phenol-formaldehyde resins more effectively than external plasticizers. Previously, however, the utilization of internal plasticizers has been limited to materials highly reactive with phenol. Since the less reactive oils could not be made to react with the phenols or substituted phenols even in the presence of acidic or basic catalyst, their properties in phenol-formaldehyde resins were heretofore unknown.

Prior to the present discovery, materials which react without catalysts and require no more than moderate heating have been utilized. For example, the use of resins made from substituted phenols prepared by reacting phenol with the highly reactive vegetable drying oils containing conjugated unsaturation is known in the art. These include tung oil, oiticica oil, and dehydrated castor oil. However, when these products are incorporated into phenol-formaldehyde resins they are relatively deficient in such important characteristics as impact resistance and flexibility, and are not as readily avaiablle as desired.

Surprisingly, we have now found that in contrast to the teachings of the prior art, substituted phenol or phenol compounds can be reacted with the less reactive unsaturated oils in the presence of selected catalysts; and these unique compounds may be utilized to produce novel phenol-formaldehyde resins exhibiting improved properties over those presently known. In particular, compounds of the present invention exhibit superior impact-resistance and flexibility as compared to prior-known compounds.

SUMMARY OF INVENTION

Phenol-formaldehyde resins exhibiting improved impact resistance and flexibiilty properties are prepared by reacting formaldehyde, phenol and phenolated compound obtained by reacting non-conjugated, unsaturated oil and an excess of a compound selected from the group consisting of phenol and substituted phenol in the presence of an active clay catalyst, the catalyst optionally containing a mineral acid.

DESCRIPTION OF INVENTION

The phenolated oils of the present invention are prepared by reacting a selected phenolic compound with a non-conjugated, unsaturated oil at temperatures in the range of from about 100 to 200° C. and preferably 160 to 170° C. in the presence of an active clay catalyst, the catalyst optionally containing mineral acid.

In carrying out the reaction it is preferable to employ an excess of the phenolic compound to force the reaction to completion and to provide sufficient reactive phenolic sites for subsequent reaction with formaldehyde. The excess of phenolic compound ensures complete reaction of the non-conjugated unsaturated oil which can be analytically determined either from the weight of the non-volatile residue or from the volatile, phenolic component.

In general, the selected phenol may be supplied in an amount of from about 3 to 20 moles per mole of non-conjugated, unsaturated oil and preferably from 8 to 15 moles per mole of non-conjugated, unsaturated oil.

As used herein, it is intended that the terms, "phenol," "substituted phenol" and "phenolic compound" may be used interchangeably.

Suitable phenol or substituted phenol compounds which may be used in the present invention include, but are not limited to, the following: phenol, resorcinol, cresol, xylenol, p-tert-butyl phenol, p-phenyl phenol, etc. There is no limitation on the phenol moiety unless substituents on the ring structure would prevent or inhibit reaction with the unsaturated oils or subsequent reaction with formaldehyde.

The selected phenol compound is reacted with unsaturated, non-conjugated oils, preferably vegetable oils such as soybean oil, cottonseed oil, safflower oil, corn oil, sunflower oil and mixtures thereof. In general, the major constituent of these oils is unsaturated fatty acid glycerides.

The active clay catalysts which may be used in the present invention are surface active clay minerals such as montmorillonite, hectorite, halloysite, attapulgite, and sepiolite etc. The various montmorillonite-rich bentonites may also be used. In general, clay minerals of the montmorillonite type constitute a preferred class for use in the present invention. The amount of clay mineral included in the reaction mixture may range from about 1 to 20%, based on the weight of the other reactants, although a preferred range is from 2 to 10%. Although the aforementioned clay catalysts when employed in mixtures or alone produce excellent products, the inclusion of mineral acid with the catalyst enhances ite performance and the ultimate end properties of the product. The clay catalyst may contain from about 1 to 10% by weight and preferably 3 to 7% by weight of mineral acid based on the active clay catalyst.

Suitable mineral acids include hydrochloric and sulfuric acid, phosphoric acid and the like. The preferred mineral acid is phosphoric acid.

Preferably, after reaction of the phenol and the non-conjugated, unsaturated oil; the reaction mixture is filtered to remove the catalyst; stripped of excess phenol under vacuum; and dried to obtain the phenolated oil. However, as shown subsequently, if the excess phenol is removed it is necessary to add back additional quantities thereof during the reaction with formaldehyde to maintain the correct formaldehyde-phenol ratio.

The excess phenol need not be removed to produce satisfactory resins as contemplated within the scope of the present invention.

The phenolated oil prepared by the aforementioned process is reacted with formaldehyde and additional phenol in accordance with methods known in the art. Such methods may include the use of amines such as hexamethylene tetramine or triethylamine to catalyze the reaction.

The amount of formaldehyde employed will depend upon the total moles of phenol whether reacted or not, utilized in preparing the resins that is, for the purpose of determining the amount of formaldehyde, the moles of phenol or substituted phenol are:

(1) the moles of phenol converted into phenolated oil
(2) the excess phenol or substituted phenol, and
(3) any additional moles of phenol added.

The molar amount of phenol is reduced by any quantities removed by stripping and/or filtering. Satisfactory amounts generally range from about 0.5 to 2.0 moles of formaldehyde per mole of phenol or substituted phenol, and preferably from 1 to 1.5 moles of formaldehyde per mole of phenol.

The reaction temperature is generally maintained between about 100 to 200° C. and preferably 160 to 170° C. After addition of the reactants, the aforementioned temperatures are maintained until the theoretical water of reaction has been removed by azeotropic distillation. In general, this period may range from about 1 to 6 hours and preferably 3 to 5 hours.

In general, from 2 to 60% by weight of the finished plasticized phenol-formaldehyde resin should consist of the selected non-conjugated, unsaturated oil and preferably 15 to 25% by weight of the finished phenol-formaldehyde resin should consist of the selected non-conjugated, unsaturated oil.

The following examples are intended as merely illustrative of the process of the present invention and in no way whatsoever intended to limit the scope of the claims attached hereto.

EXAMPLE 1

A phenolated soybean oil was prepared by reacting 1,000 grams (approximately 10 moles) of phenol with 1,000 grams (approximately 1 mole) of alkali refined soya oil in the presence of 120 grams of a montmorillonite clay sold under the trademark Filtrol No. 1, and 4 grams of phosphoric acid catalyst. The mixture was heated to 165° C. in a 3-liter, 3-neck round-bottom flask equipped with thermometer, agitator, and water-cooled condenser. After 4 hours at 165° C., the product was cooled to 110° C. and filtered to remove the clay. The excess unreacted phenol was removed by distillation at a pressure of 1.0 mm. of mercury. The product was a pale yellow liquid with a slight phenol odor and had the following characteristics:

acid value=2.7
hydroxyl value=113.4
saponification equivalent=375.8
saponification value=149.9

EXAMPLE 2

A phenolated soybean oil was prepared as in Example 1, except that it was not stripped of excess phenol. One half of this product, Part A, was filtered. The remaining half, Part B, was not filtered.

EXAMPLE 3

An unplasticized phenol-formaldehyde resin was prepared in a 1-liter, 3-neck round-bottom flask equipped with thermometer, agitator, and Dean and Stark trap with water-cooled condenser by reacting 137 grams of phenol with 163 grams of a solution of 40% by weight of formaldehyde in a solution of 1-butanol and water (sold under the Celanese Corporation trademark Butyl Formcel) in the presence of 10 ml. triethylamine catalyst. The mixture was diluted with 24 grams of 1-butanol and 41 grams of toluene and heated to 115° C. The mixture was held at 115° C. under steady reflux for one hour. 21.5 ml. of water was removed. The mixture was then cooled and discharged.

EXAMPLE 4

Using the same equipment and procedure as in Example 3, 214 grams of phenol, 257 grams of Butyl Formcel, and 64 grams of tung oil with 15 ml. of triethylamine catalyst were diluted with 108 grams of 1-butanol and 88 grams of toluene. The mixture was reacted for 4 hours after which time 31 ml. of water had been removed. The product was cooled and discharged.

EXAMPLE 5

Using the equipment and procedure of Example 3, 194 grams of phenol, 257 grams of Butyl Formcel, and 85 grams of the product from Example 1, with 15 ml. of triethylamine catalyst were reacted in 108 grams of 1-butanol and 88 grams of toluene. The reaction was run for 3½ hours until 31 ml. of water had been removed. The product was cooled and discharged.

EXAMPLE 6

Using the equipment and procedure of Example 3, 150 grams of phenol, 257 grams of Butyl Formcel, and 129 grams of Part A of the product from Example 2, with 15 ml. of triethylamine catalyst were reacted in 108 grams of 1-butanol and 88 grams of toluene. The reaction was run for 4 hours after which time 32 ml. of water had been removed. The product was cooled and discharged.

EXAMPLE 7

Using the equipment and procedure of Example 3, 150 grams of phenol, 257 grams of Butyl Formcel, and 133 grams of the product of Part B, Example 2, in the presence of 15 ml. of triethylamine catalyst were reacted in 108 grams of 1-butanol and 88 grams of toluene. The reaction was run for 4 hours after which time 31.5 ml. of water had been removed. The product was cooled and discharged.

EXAMPLE 8

A phenolated soybean oil was prepared as in Example 1 except that 67 grams of phenol, 67 grams of alkali refined soybean oil, with 0.2 gram of phosphoric acid catalyst, were reacted without a clay catalyst. The reaction mixture was heated four hours at 165° C. The product was not filtered or stripped of excess phenol. The product was then cooled.

EXAMPLE 9

Using the equipment and procedure of Example 3, 150 grams of phenol, 257 grams of Butyl Formcel, and 134 grams of the product from Example 8, with 10 ml. of triethylamine catalyst were reacted in 108 grams of 1-butanol and 88 grams of toluene. The reaction was run for 4 hours after which time 31 ml. of water had been removed. The product was cooled and discharged.

EXAMPLES 10–15

The phenol-formaldehyde resin solutions of Examples 3, 4, 5, 6, 7, and 9 were used to prepare the pressed cured laminates of Examples 10, 11, 12, 13, 14, and 15, respectively. Ten sheets of grade E and D 615 filter paper were immersed in each resin solution and air-dried 15 minutes. The sheets were then pre-cured for 60 minutes at 60° C. Subsequently, they were stacked and pressed at 1200 p.s.i. at 350° F. for one hour. The laminates were then subjected to A.S.T.M. standard hydraulic cold punch test (punchability) and a Gardner Impact Tester (impact-resistance) and the results were recorded in Table 1.

TABLE I

| Example No. | Resin product from example | Catalyst | Product treatment | Punchability | Impact resistance |
|---|---|---|---|---|---|
| 10 | 3 | None | | Fail | Poor. |
| 11 | 4 | do | | do | Good. |
| 12 | 5 | Filtrol No. 1 $H_3PO_4$ | Stripped and filtered | Pass | Do. |
| 13 | 6 | do | Filtered | do | Fair. |
| 14 | 7 | do | | do | Do. |
| 15 | 9 | $H_3PO_4$ | | Fail | Poor. |

Examples 12 through 14 demonstrate that filtering the catalyst and/or stripping excess phenol from the phenolated oil gives some variation in laminate properties. However, the overall performance of the laminates of Examples 12–14 is substantially better than that of Examples 10, 11, and 15 which were prepared without the surface active clay catalyst. These data also indicate that according to the process of this invention satisfactory phenol-formaldehyde resins may be prepared in situ without the intermediate filtering or stripping steps.

As will be evident to those skilled in the art, various modifications of the present invention can be made or followed in the light of the foregoing disclosure and discussion without departing from the spirit or scope of the following claims.

We claim:

1. In a process for preparing phenol-formaldehyde resins wherein formaldehyde is reacted with phenol at a temperature from about 100° C. to 200° C. in the presence of an amine catalyst, to obtain resins having improved internal flexibility, the improvement which comprises adding a phenolated compound comprising:
   (a) a non-conjugated unsaturated oil selected from the group consisting of soybean oil, safflower oil, cottonseed oil, corn oil and sunflower oil; and
   (b) a phenolic compound selected from the group consisting of phenol, resorcinol, cresol, xylenol, p-tert-butyl phenol aind p-phenylphenol; wherein (a) and (b) are reacted in a molar ratio 3–20:1 at a temperature from about 100° C. to 200° C. in the presence of a surface-active clay catalyst selected from the group consisting of montmorillonite, hectorite, halloysite, attapulgite and sepiolite; and wherein the amount of said phenolated compound employed is such that the finished phenol-formaldehyde resin contains about 2% to 60% by weight (a).

2. A varnish comprising:
   (a) a phenolic resin prepared in accordance with claim 1, and
   (b) a solvent consisting of a mixture 1-butanol and toluene.

3. The process of claim 1 wherein the phenolated compound is filtered and unreacted phenolic compound removed under vacuum prior to being added to the phenol-formaldehyde reaction mixture.

4. The process of claim 1 wherein about 8 to 15 moles (a) per mole (b) are reacted and the amount of phenolated compound employed with the phenol and formaldehyde is such that the finished phenol-formaldehyde resin contains 15% to 25% by weight (a).

5. The process of claim 3 wherein the surface-active clay catalyst ranges from about 1% to 20% based on the combined weight of (a) and (b) and contains from about 1% to 10% by weight of a mineral acid.

6. The process of claim 4 wherein the surface-active clay catalyst ranges from about 1% to 20% based on the combined weight of (a) and (b) and contains from about 1% to 10% by weight of a mineral acid selected from the group consisting of hydrochloric acid, sulfuric acid and phosphoric acid and the phenolated compound is filtered and unreacted phenolic compound removed under vacuum prior to being added to the phenol-formaldehyde reaction mixture.

7. The process of claim 6 wherein the molar ratio of formladehyde to total moles of phenol ranges from about 0.5–2:1.

8. The process of claim 6 wherein the phenolated compound is prepared at a temperature from about 160° C. to about 170° C. in the presence of from 2% to 10% surface-active clay catalyst based on the amount of (a) and (b) containing from about 3% to 7% phosphoric acid.

References Cited

UNITED STATES PATENTS

| | | | |
|---|---|---|---|
| 2,001,525 | 5/1935 | Coleman | 260—19 |
| 2,151,975 | 3/1939 | Kline | 260—53 |
| 2,406,337 | 8/1946 | Auer | 260—19 |
| 2,843,566 | 7/1958 | Christendon et al. | 260—19 |
| 3,066,160 | 11/1962 | Hampton | 260—97.6 |

OTHER REFERENCES

"Encyclopedia of Chemical Technology," 1954 (pp. 53 to 56 relied on).

DONALD E. CZAJA, Primary Examiner

W. E. PARKER, Assistant Examiner